(12) United States Patent
Winget et al.

(10) Patent No.: US 7,919,031 B2
(45) Date of Patent: Apr. 5, 2011

(54) METHOD AND SYSTEM FOR MAKING PLASTIC CELLULAR PARTS AND THERMOPLASTIC COMPOSITE ARTICLES UTILIZING SAME

(75) Inventors: Larry J. Winget, Leonard, MI (US); Darius J. Preisler, Macomb, MI (US)

(73) Assignee: Global IP Holdings, LLC, Sterling Heights, MI (US)

( * ) Notice: Subject to any disclaimer, the term of this patent is extended or adjusted under 35 U.S.C. 154(b) by 271 days.

(21) Appl. No.: 12/104,698

(22) Filed: Apr. 17, 2008

(65) Prior Publication Data

US 2009/0261493 A1 Oct. 22, 2009

(51) Int. Cl.
*B29C 35/02* (2006.01)
*B29C 45/00* (2006.01)

(52) U.S. Cl. ............... 264/259; 264/328.1; 425/542; 249/64

(58) Field of Classification Search ............... 264/39, 264/154, 328.1, 259; 425/542, 548, 577; 249/60, 64
See application file for complete search history.

(56) References Cited

U.S. PATENT DOCUMENTS

| | | | | | |
|---|---|---|---|---|---|
| 2,183,380 | A | * | 12/1939 | Hurt | 2/67 |
| 2,566,817 | A | * | 9/1951 | Yellin | 249/60 |
| 2,712,159 | A | * | 7/1955 | Marsch | 264/316 |
| 2,780,946 | A | * | 2/1957 | McGuire | 408/1 R |
| 3,700,205 | A | * | 10/1972 | Ditges | 249/142 |
| 3,926,463 | A | * | 12/1975 | Landwehr et al. | 293/136 |
| 4,162,781 | A | * | 7/1979 | Morcom | 249/144 |
| 5,040,966 | A | * | 8/1991 | Weisse | 425/403 |
| 5,139,596 | A | | 8/1992 | Fell | |
| 5,683,782 | A | | 11/1997 | Duchene | |
| 6,050,630 | A | | 4/2000 | Hochet | |
| 6,435,577 | B1 | | 8/2002 | Renault | |
| 6,537,413 | B1 | | 3/2003 | Hochet et al. | |
| 6,655,299 | B2 | | 12/2003 | Preisler et al. | |
| 6,682,675 | B1 | | 1/2004 | Vandangeot et al. | |
| 6,682,676 | B1 | | 1/2004 | Renault et al. | |
| 6,686,007 | B2 | | 2/2004 | Murphy | |
| 6,748,876 | B2 | | 6/2004 | Preisler et al. | |
| 6,790,026 | B2 | | 9/2004 | Vandangeot | |
| 6,823,803 | B2 | | 11/2004 | Preisler | |
| 6,843,525 | B2 | | 1/2005 | Preisler | |
| 6,890,023 | B2 | | 5/2005 | Preisler et al. | |
| 6,890,025 | B2 | | 5/2005 | Hanke | |
| 6,981,863 | B2 | | 1/2006 | Renault | |
| 2002/0043747 | A1 | | 4/2002 | Vismara | |
| 2002/0121718 | A1 | * | 9/2002 | Winget et al. | 264/102 |
| 2003/0098521 | A1 | * | 5/2003 | Donovan et al. | 264/172.19 |
| 2004/0241383 | A1 | | 12/2004 | Watanabe et al. | |
| 2005/0189674 | A1 | | 9/2005 | Hochet | |

* cited by examiner

*Primary Examiner* — Jill L Heitbrink
(74) *Attorney, Agent, or Firm* — Brooks Kushman P.C.

(57) ABSTRACT

A method and system for making plastic cellular parts and thermoplastic composite articles utilizing the cellular parts are provided. The method includes providing a mold having a mold cavity with an interior surface to define the shape of the cellular part and at least one resin flow path extending from an outer surface of the mold to the mold cavity. The method further includes providing first and second sets of projections or pins. The first set of projections extend into the mold cavity from a first direction and the second set of projections extend into the mold cavity from a second direction opposite the first direction. The projections define cells which open to opposing outer surfaces of the cellular part. The method still further includes filling the mold cavity, with the projections extending into the mold cavity, with molten plastic resin from the at least one resin flow path and removing the cellular part from the mold cavity of the mold after the cellular part hardens.

21 Claims, 3 Drawing Sheets

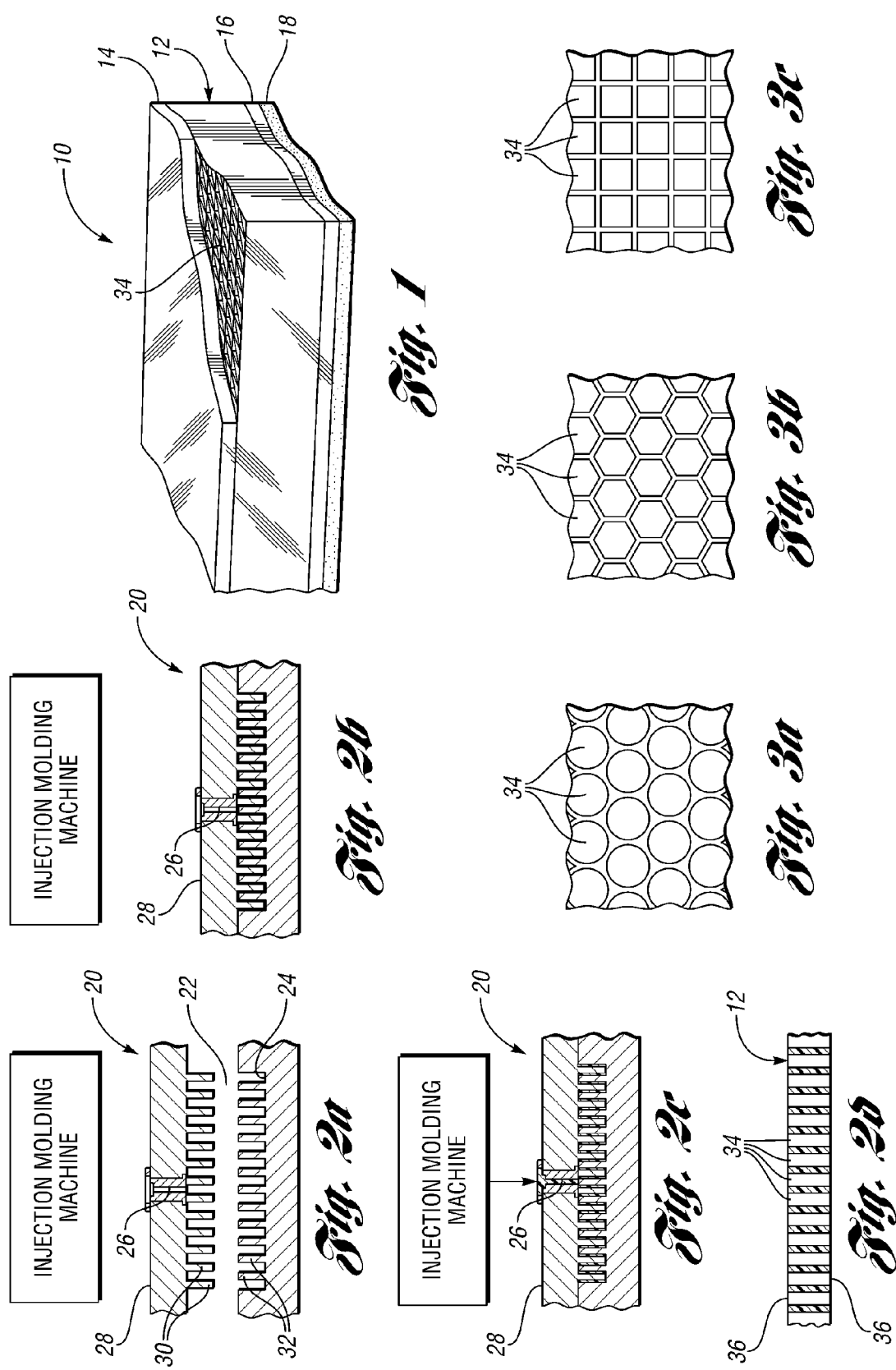

METHOD AND SYSTEM FOR MAKING PLASTIC CELLULAR PARTS AND THERMOPLASTIC COMPOSITE ARTICLES UTILIZING SAME

BACKGROUND OF THE INVENTION

1. Field of the Invention

This invention relates to methods and systems for making plastic cellular parts and thermoplastic composite articles utilizing such plastic cellular parts.

2. Background Art

One type of recyclable, lightweight, high-strength, composite material or article comprises a "honeycombed" cellular core positioned between two thermoplastic skins reinforced with glass and polypropylene. Polypropylene is highly regarded for its heat and chemical resistance as well as for its ability to withstand wear and tear. The thermoplastic skins, tough and meltable for reuse, have a degree of elasticity between 5 and 20GPa, depending on fiber content and orientation. The composite article typically ranges in thickness between 5 and 30 mm. Its weight ranges from 1700 to 6000 $g/m^2$, depending on skin and core materials.

In contrast to more conventional thermoset resin composites, thermoplastics used in the composite article provide greater robustness due to their tougher matrix. They also offer enhanced formability and functional integration, consist of less expensive raw materials and can be processed faster. Also, living hinges (i.e., U.S. published application 2005/0189674) and deep draw shapes (i.e., U.S. Pat. Nos. 6,682,675; 6,682,676; 6,790,026; and 6,981,863) can be made with the composite article while maintaining structural integrity.

Via thermocompression, production is a one-step process that takes approximately one minute (i.e., U.S. Pat. Nos. 6,050,630 and 6,537,413). Simultaneous exposure to heat and pressure changes the "sandwich" to a thermoplastic composite, yielding high-strength-to-weight and high-stiffness-to-weight properties as well as a finished product that is highly resistant to heat, impact and corrosion.

Applications for such thermoplastic composite materials or articles include pallets (i.e., U.S. Pat. Nos. 6,655,299; 6,748,876; and 6,823,803), vehicle load floors (i.e., U.S. Pat. No. 6,843,525), under-engine fairings (U.S. Pat. No. 6,435,577), inner roof panels (U.S. Pat. No. 6,890,025), trunk panels, backrests, aerodynamic skid plates, spare wheel pans, and front and rear vehicle bumpers.

One way to make the interior plastic cellular core or honeycomb part is to make the core from a plurality of small co-extruded tubes bonded to each other along their sides (i.e., U.S. Pat. No. 5,683,782). The small tubes have a base body made of a thermoplastic and which, at least on the outside, preferably on the outside and on the inside, carries a coating made of an adhesively-active thermoplastic material. As a result of this coating, a bonding of the small honeycomb tubes to each other as well as to a cover layer is possible.

Another way to make a plastic cellular or honeycomb part is to make the fiber-reinforced thermoplastic honeycomb in a continuous manner one half cell at a time by laying down a corrugated web of thermoplastic, with and without fiber-reinforcement atop a honeycomb, selectively fusing the node-antinode demes and repeating the process until a honeycomb of the desired depth is prepared (i.e., U.S. Pat. No. 5,139,596).

Yet still another way to make a plastic cellular or honeycomb part is to injection mold the honeycomb part in plastic (U.S. published application Nos. 2002/0043747 and 2004/0241383).

A common problem in the molding of plastic components is that the solidified plastic component often sticks to the component-defining surfaces of the mold. As a result, the mold cycle times are unnecessarily extended. Also, the article-defining surface as well as the resin flow path within the mold must be cleaned and/or lubricated on a periodic basis to ensure that subsequently molded plastic components are not contaminated with plastic that was previously stuck within the mold. This problem is especially acute where color of the plastic component has been changed.

One way of reducing this sticking problem is to utilize a mold release spray or lubricant wherein the spray is deposited on the surface layers which define the article-defining cavity. However, the use of such a spray is not only time-consuming but expensive.

Another way of reducing the sticking within the article-defining cavity is to incorporate release agents within the plastic itself. However, the use of such release agents present other problems including the expense of incorporating such release agents within the plastic material.

Another way of reducing the sticking problem is to use increased molding pressures. However, here again, the use of increased molding pressures adds even more problems to the molding process.

U.S. Pat. No. 6,686,007 discloses a plastic injection mold having at least one self-lubricating surface layer which provides at least one substantially non-stick surface.

SUMMARY OF THE INVENTION

An object of at least one embodiment of the present invention is to provide low cost and simple methods and systems for making plastic cellular parts and thermoplastic composite articles utilizing same.

In carrying out the above object and other objects of at least one embodiment of the present invention, a method of making a plastic cellular part is provided. The method includes providing a mold having a mold cavity with an interior surface to define the shape of the cellular part and at least one resin flow path extending from an outer surface of the mold to the mold cavity. The method further includes providing first and second sets of projections. The first set of projections extend into the mold cavity from a first direction and the second set of projections extend into the mold cavity from a second direction opposite the first direction. The projections define cells which open to opposing outer surfaces of the cellular part. The method still further includes filling the mold cavity, with the projections extending into the mold cavity, with molten plastic resin from the at least one resin flow path and removing the cellular part from the mold cavity of the mold after the cellular part hardens.

The first set of projections may be interdigitated with respect to the second set of projections.

The mold may be filled using an injection molding machine and the part may be an injection molded part.

The projections may be tapered to facilitate removal of the part from the mold cavity.

The projections may have different lengths and different portions of the part may have corresponding different thicknesses.

The cellular part may be constituted mainly of polyolefin, and preferably polypropylene.

Outer surfaces of the cellular part may have a substantially final desired configuration after the step of removing.

The cellular part may have a thickness in a range of 5 mm to 30 mm and the open cells may have a diameter in a range of 2 mm to 10 mm.

The cellular part may have a honeycomb-like structure.

The method may further include providing a flange which may extend into the cavity to define a hinge between two portions of the cellular part.

The flange may extend into the cavity from the interior surface of the cavity.

The projections may have self-lubricating surface layers which may define the open cells of the cellular part and which may facilitate removal of the part from the mold cavity.

Further in carrying out the above object and other objects of at least one embodiment of the present invention, a method of making a thermoplastic composite article is provided. The method includes providing a mold having a mold cavity with an interior surface to define the shape of the cellular part and at least one resin flow path extending from an outer surface of the mold to the mold cavity. The method further includes providing first and second sets of projections. The first set of projections extend into the mold cavity from a first direction and the second set of projections extend into the mold cavity from a second direction opposite the first direction. The projections define cells which open to opposing outer surfaces of the cellular part. The method still further includes filling the mold cavity, with the projections extending into the mold cavity, with molten plastic resin from the at least one resin flow path and removing the cellular part from the mold cavity of the mold after the cellular part hardens. The method yet further includes the steps of heating first and second skin layers of a reinforced thermoplastic material to a softening temperature in the range of 120° C. to 200° C. and cold-pressing, at a pressure in a range of 10 bars to 30 bars, in a single step of molding, a stack comprising the heated first and second skin layers and the cellular part between the first and second skin layers to form the thermoplastic composite article.

The inner surfaces of the first and second skin layers may have a substantially final desired configuration after the step of heating and before the step of cold-pressing.

The skin layers may be made of a woven fabric or mat of glass fibers and the thermoplastic material.

The article may have a relatively uniform or non-uniform thickness.

The composite article may be recyclable.

The cellular part and the skin layers may be constituted mainly of polyolefin, and preferably polypropylene.

Still further in carrying out the above object and other objects of at least one embodiment of the present invention, a system for making a plastic cellular part is provided. The system includes a mold having a mold cavity with an interior surface to define the shape of the cellular part and at least one resin flow path extending from an outer surface of the mold to the mold cavity. The system further includes first and second sets of projections. The first set of projections extend into the mold cavity from a first direction and the second set of projections extend into the mold cavity from a second direction opposite the first direction. The projections define cells which open to opposing outer surfaces of the cellular part. The system still further includes an injection molding machine for filling the mold cavity, with the projections extending into the mold cavity, with molten plastic resin from the at least one resin flow path.

Yet still further in carrying out the above object and other objects of at least one embodiment of the present invention, a system for making a thermoplastic composite article is provided. The system includes a mold having a mold cavity with an interior surface to define the shape of the cellular part and at least one resin flow path extending from an outer surface of the mold to the mold cavity. The system further includes first and second sets of projections. The first set of projections extend into the mold cavity from a first direction and the second set of projections extend into the mold cavity from a second direction opposite the first direction. The projections define cells which open to opposing outer surfaces of the cellular part. The system still further includes an injection molding machine for filling the mold cavity, with the projections extending into the mold cavity, with molten plastic resin from the at least one resin flow path. The system includes a means or apparatus for heating first and second skin layers of a reinforced thermoplastic material to a softening temperature in the range of 120° C. to 200° C. and a cold-pressing mold for cold-pressing, at a pressure in a range of 10 bars to 30 bars, a stack comprising the heated first and second skin layers and the cellular part between the first and second skin layers to form the thermoplastic composite article.

The above object and other objects, features, and advantages of at least one embodiment of the present invention are readily apparent from the following detailed description of the best mode for carrying out the invention when taken in connection with the accompanying drawings.

BRIEF DESCRIPTION OF THE DRAWINGS

FIG. 1 is a perspective schematic view, partially broken away and in cross section, of a thermoplastic composite article with a plastic cellular part or core having open cells and constructed in accordance with one at least embodiment of the method and system of the present invention;

FIGS. 2a-2c are side schematic views, partially broken away and in cross section, of an injection molding system which illustrates various steps of at least one embodiment of the method of making a plastic cellular core, a side elevational view, partially broken away and in cross section, of which is shown in FIG. 2d;

FIGS. 3a-3c are top plan schematic views, partially broken away, of different configurations (i.e., honeycomb-like) of plastic cellular cores having open cells and constructed in accordance with at least one embodiment of the present invention;

DETAILED DESCRIPTION OF THE PREFERRED EMBODIMENT(S)

In general, at least one embodiment of the present invention relates to a method and system for making plastic cellular cores in a cost effective and simple fashion using injection molding techniques and apparatus. The resulting cellular cores can then be utilized in methods and systems for making thermoplastic composite articles, also in a cost effective and simple fashion, using cold-press molding techniques and apparatus.

Figure 10:
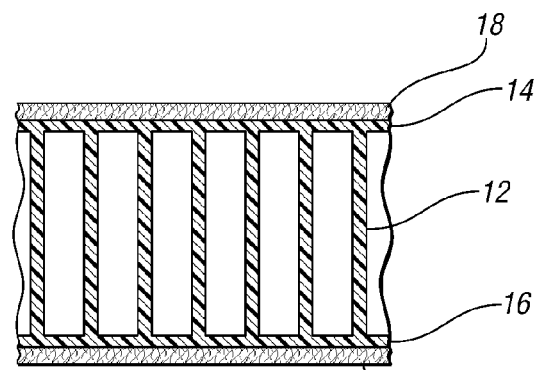
FIG. 10 is a side schematic view, partially broken away and in cross section, of a thermoplastic composite article formed as a result of cold-pressing a stack of generally planar, heated skin layers and a sandwiched, generally planar, cellular core.
Figure 11:
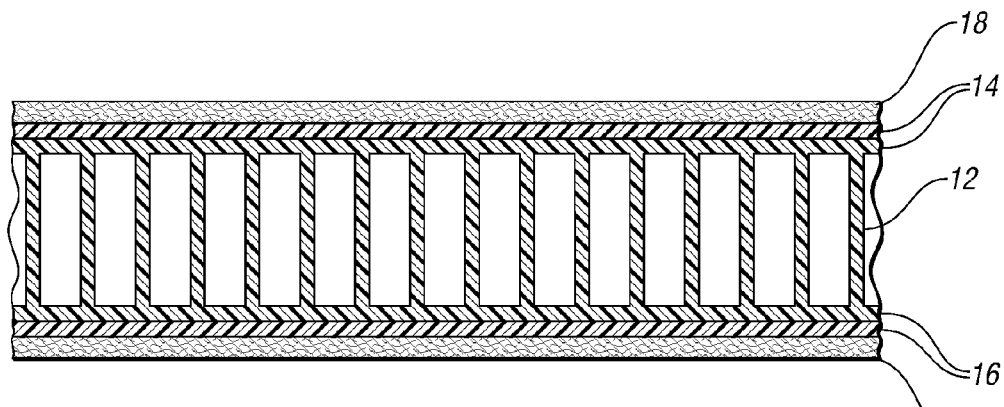
FIG. 11 is a side schematic view, partially broken away and in cross section, of a different thermoplastic composite article formed as a result of cold-pressing a stack including four generally planar, heated skin layers and a sandwiched, generally planar, cellular core.

Referring now to the drawing Figures, there is illustrated in FIG. 1 a portion of a reinforced composite article, generally indicated at 10, of the sandwich-type having a cellular core or part, generally indicated at 12. The article 10 also includes one or more upper skin layers and one or more lower skin layers 14 and 16, respectively, made of a reinforced thermoplastics material. In addition, the article 10 may include one or more outer covering layers 18 made of a woven or nonwoven material disposed on the lower skin layer 16 (and on the upper skin layer 14 if more than one outer covering layer is provided as shown in FIGS. 10 and 11). The outer covering layer(s) 18 may be made of felt or carpeting, such as polypropylene carpeting.

The upper skin layer 14 (as well as any outer covering layer) typically extends downwardly to the lower skin layer 16 at the front, back and side edges of the core 12 so that the core 12 is substantially totally enclosed by the skin layers 14 and 16. In this way the edges are finished not only for safe handling, but also to stop pest and dirt intrusion. Also, the finished edges are cosmetically appealing.

Materials Used for the Skin Layers 14 and 16

The skin materials are preferably made of a polyolefin such as polypropylene reinforced with fibers. However, other materials can also be used.

The properties of the skin layers 14 and 16 depend on:
Glass content (typically 20 wt % to 60 wt %);
Glass orientation, woven 50/50 or 80/20 as needed for loads;
Structure of the reinforcement (continuous woven fibers, continuous UD fibers, random glass mats, chopped glass fibers, etc) and the core 12; and
Thickness, which depends on load and application but generally not to exceed 30 mm and at least 5 mm.

Each skin layer 14 or 16 is characterized by its weight per surface within a range of typically 400 to 1500 g/m$^2$.

Some examples of the materials used for the skin layers 14 and 16 are:
Woven co-mingled fibers. Glass fibers and polypropylene fibers are co-mingled to form a hybrid roving. The process yields a product in which the glass fibers and thermoplastic fibers are uniformly dispersed. This co-mingling technique allows for a high glass fiber content (60 to 75 wt %) because it ensures a good fiber wetting by the matrix. Adequate wetting of the glass fibers ensures high mechanical performance of the composite article 10. Hybrid rovings are then woven with several possible orientations. When the roving is heated above the melting point of the thermoplastic fibers, the thermoplastic flows around the glass fibers. The uniform co-mingling of the glass and thermoplastic fibers limits the distance the thermoplastic is required to flow and allows the material to be molded with very low pressures (about 10 bars to a maximum of about 30 bars). A commercial material is Twintex manufactured by Vetrotex Saint Gobain. Twintex is typically preconsolidated before being used in the process.

Mat of fibers with PP. It is a thin, continuous roll stock made of partially-consolidated polypropylene reinforced with fiber glass mat. Many thicknesses are available from a glass basis weight of 80 g/m$^2$ up to 1000 g/m$^2$. Glass content can vary from 20% by weight to 50% or more. The glass fibers are in a random configuration. It is also possible to use other types of fibers such as natural fibers, carbon fibers, and aramid fibers.

The cellular core 12 has an open-celled structure of the honeycomb cell type, constituted mainly of polyolefin and preferably polypropylene. Referring to FIGS. 2a-2c, there is illustrated a method of making the plastic injection molded cellular part or core 12. The method includes providing a mold, generally indicated at 20, having a mold cavity 22 with an interior surface 24 to define the shape of the cellular part 12 and at least one resin flow path 26 extending from an outer surface 28 of the mold 20 to the mold cavity 22. A first set of projections or pins 30 extend from the interior surface of the upper mold half into the mold cavity 22 from a first direction and touch or almost touch the interior surface the lower mold half. A second set of projections or pins 32 extend into the mold cavity 22 from a second direction opposite the first direction. The projections 30 and 32 define cells 34 of the part 12 which open to opposing outer surfaces 36 of the cellular part 12, as shown in FIG. 2d.

Figure 4:
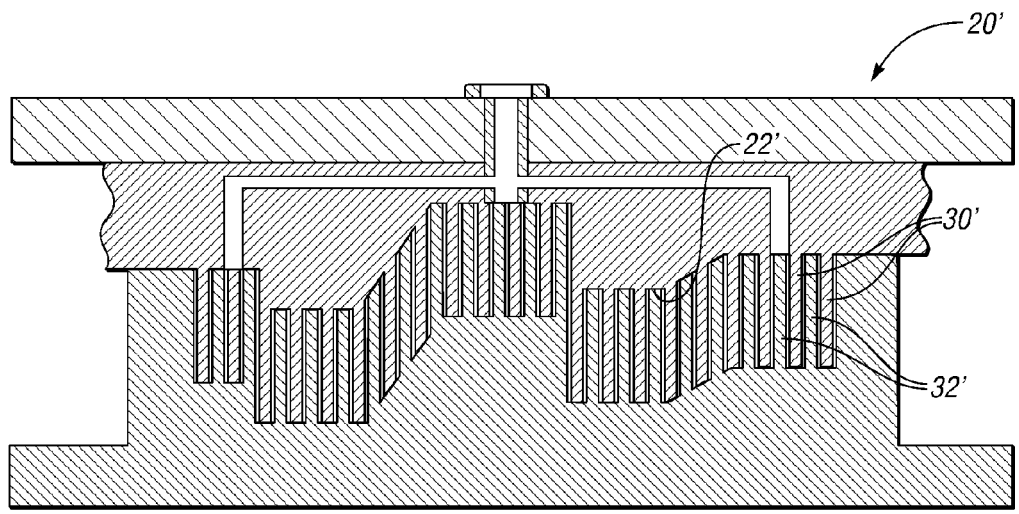
FIG. 4 is a side elevational schematic view, partially broken away and in cross section, of a mold constructed in accordance with at least one embodiment of the method and system of the present invention which mold makes a plastic cellular core having different thicknesses.

The mold cavity 22 is filled by an injection molding machine as shown in FIG. 2c, with the sets of projections 30 and 32 extending into the mold cavity 22, with molten plastic resin from the machine flowing along at least one resin flow path 26 to the mold cavity 22. A manifold such as a hot runner manifold (as shown in FIG. 4) may be used to provide a number of drops into the mold cavity 22. The resulting cellular part or core 12 is removed from the mold cavity 22 of the mold 20 after the cellular part 12 hardens, as shown in FIG. 2d.

The cells 34 may have the configuration of FIG. 1 (i.e., triangular) or the cells 34 may form a honeycomb including cylindrical, hexagonal, or square cells (as illustrated in FIGS. 3a-3c, respectively). Other shapes are also possible. The axes of the cells 34 are perpendicular to the outer surfaces 36 of the core 12 as well as the skin layers 14 and 16 of the article 10. Cell density is adjusted as needed for load. The open cells 34 typically have a diameter in a range of 2 mm to 10 mm.

Figure 6:
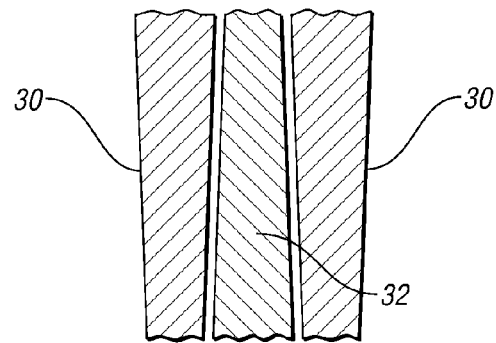
FIG. 6 is a side schematic view, partially broken away, of three interdigitated or interleaved tapered projections or pins for use in at least one embodiment of the present invention.

As shown in FIG. 6, the first set of projections or pins 30 are preferably interdigitated or interleaved with respect to the second set of projections or pins 32. The projections 30 and 32 are also preferably tapered to facilitate removal of the part 12 from the mold cavity 32. When mold halves of the mold 20 move apart relative to each other, friction between one set of pins and the hardened part 12 tends to help remove the part 12 from the other set of pins.

Referring now to FIG. 4, in another embodiment of the invention, projections or pins 30' and 32' extend in opposite directions into a mold cavity 22' of a mold 20'. The pins 30' and 32' have different lengths so that different portions of the resulting part 12' (i.e., FIG. 9) have corresponding different thicknesses. This feature substantially reduces or eliminates the need to locally crush portions of the part 12' if those portions require a smaller thickness or need to be curved as shown in the prior art. In this way the outer surfaces 36' (i.e., FIG. 9) of the cellular part 12' have a substantially final desired configuration after the part 12' is removed from the mold 20'.

Figure 5:
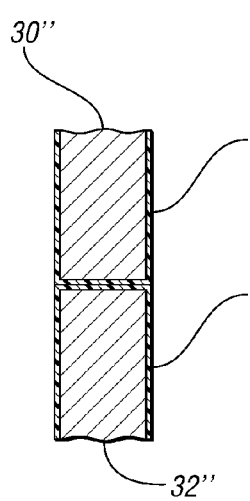
FIG. 5 is a side schematic view, partially broken away and in cross section, of two abutting projections or pins having self-lubricating surface layers for use in at least one embodiment of the present invention.

Referring now to FIG. 5, projections 30" and 32" may be provided to have self-lubricating surface layers 31" and 33", respectively, (as illustrated in U.S. Pat. No. 6,686,007) to define open or near-open cells of the resulting cellular part and facilitate removal of the part from the mold cavity of the mold. The projections 30" and 32" are shown in FIG. 5 as abutting each other but the projections 30" and 32" may be interleaved and extend from their mold halves completely across the mold cavity to abut the interior surface of the opposite mold half.

Figure 7:
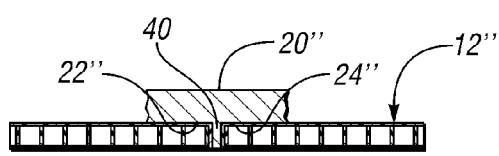
FIG. 7 is a side schematic view, partially broken away, of a flange extending into a mold cavity for use in at least one embodiment of the present invention to define a hinge between two portions of a resulting cellular part.
Figure 8:
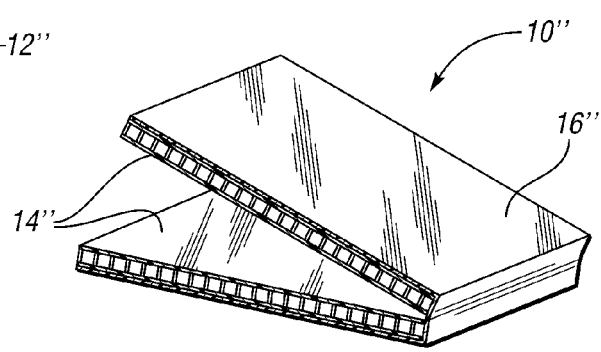
FIG. 8 is a perspective schematic view of a hinged thermoplastic composite article including the hinged cellular part of FIG. 7 in a folded position.

Referring now to FIG. 7, a rim or flange 40 extends into a cavity 22" of a mold 20" (only a portion of which is shown) to define a hinge between two portions of a cellular part 12" after the part 12" is molded. The flange 40 extends into the cavity 22" from an interior surface 24" of the cavity 22". The resulting part is then heated and pressed in a cold-pressing mold as previously described typically with planar skin layers 14" and 16" to form an article 10". As shown in FIG. 8, the article 10" is shown in its folded condition. The layer 14" is formed in two sections while the layer 16" comprises a single section which is folded.

Figure 9:
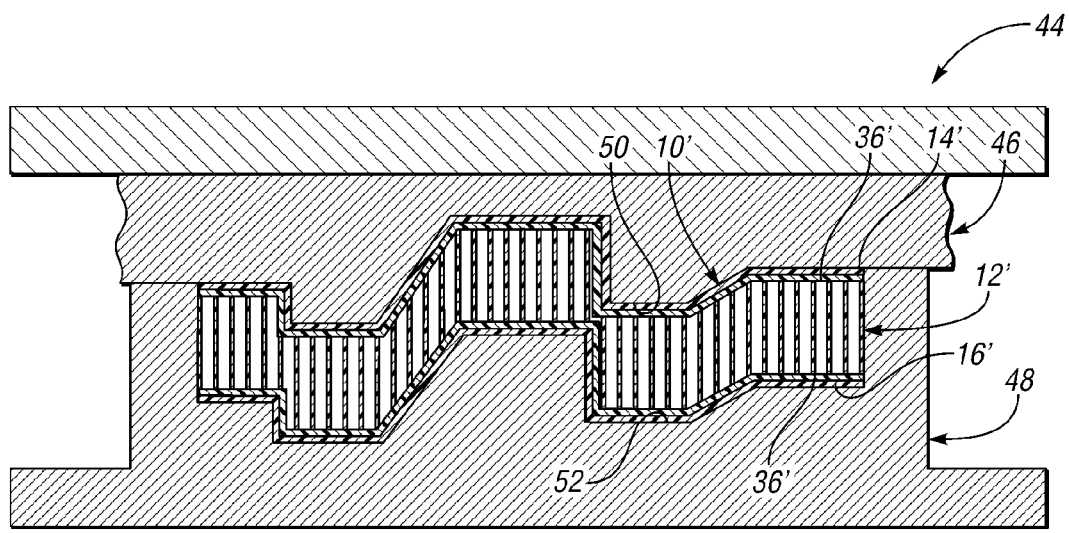
FIG. 9 is a side elevational schematic view, partially broken away and in cross section, of a mold for cold pressing (in a single step) a stack comprising the cellular part of FIG. 4 between a pair of heated, preformed first and second skin layers to form the resulting composite article.

In the method of making an article 10' of FIG. 9, a stack of skin layers 14' and 16' and the core 12' (and the layer(s) 18' if desired) are preferably pre-assembled. Then, the pre-assembled stack is heated in an oven (not shown). The pre-assembled stack is heated such that the skin layers 14' and 16' of the stack have a forming temperature approximately in the range of 120° C. to 200° C. The temperatures to which the pre-assembled stack is heated are higher than the degradation temperature of the polypropylene constituting the matrices of the skin layers 14' and 16', as well as the cellular core 12', but that does not degrade the mechanical characteristics of the resulting article 10'.

The temperature to which the pre-assembled stack is heated in the method of making the article 10' lies in a range extending from a low temperature enabling the skin layers 14' and 16' to be bonded to the cellular core 12', in a time compatible with mass production constraints, without the cellular core 12' of the stack being weakened accordingly, to a maximum temperature while avoiding degrading the polypropylene too rapidly.

Generally, the quantity of heat transmitted through the skin layers 14' and 16' and the cellular core 12' is inversely proportional to the thickness of the skin layers 14' and 16'.

For a given pre-assembled stack temperature and a given pre-assembled stack-heating time, it is possible to bond a skin layer of given thickness. If the skin layer is too thin, it reaches a temperature such that it is degraded. If the skin is too thick, the heat does not arrive in sufficient quantity to enable the skin layers and the core to be bonded together.

For example, in order to bond a skin layer made of a 4×1 woven fabric of weight per unit area of 915 g/m² to a cellular core, provision is made for the heating time to lie in the range 55 seconds to 75 seconds. By using an identical skin of weight per unit area of 1,420 g/m², a heating time lying in the range of 70 seconds to 85 seconds is necessary to bond the skin layer to the cellular core without degrading it. Similarly, it has been determined that, for an identical skin layer having a weight per unit area of 710 g/m², a heating time lying in the range 55 seconds to 65 seconds is necessary to bond it to the cellular core without degrading it.

Referring again to FIG. 9, there is illustrated a compression or cold-pressing mold, generally indicated at 44, for making the article 10'. The compression mold 44 includes first and second mold halves, generally indicated at 46 and 48, respectively, between which is placed a stack comprising heated blanks of glass-reinforced thermoplastic sheets or layers 14' and 16' which sandwich the core 12' therebetween. The stack of materials are pressed between cool mold surfaces 50 and 52 of the first and second mold halves 46 and 48, respectively, under a pressure lying in the range of 10 to 30 bars (i.e., $1 \times 10^6$ Pa to $3 \times 10^6$ Pa).

The method of making the article 10 from the core 12 and the layers 14 and 16 and the method of making the article 10' from the core 12' and the layers 14' and 16' comprise a small number of operations that are simple and quick to perform. They use standard equipment for performing the above-mentioned operations which are controlled very well, and therefore entirely suitable for being implemented at high production throughputs, while also guaranteeing constant quality and economic competitiveness.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A method of making a thermoplastic composite article, the method comprising:
    providing a mold having a mold cavity with an interior surface to define the shape of the cellular part and at least one resin flow path extending from an outer surface of the mold to the mold cavity;
    providing first and second sets of projections, the first set of projections extending into the mold cavity from a first direction and the second set of projections extending into the mold cavity from a second direction opposite the first direction, the projections defining cells which open to opposing outer surfaces of the cellular part wherein the projections have different lengths, and wherein different portions of the cellular part have corresponding different thicknesses or at least one portion of the cellular part is curved;
    filling the mold cavity, with the projections extending into the mold cavity, with molten plastic resin from the at least one resin flow path;
    removing the cellular part from the mold cavity of the mold after the cellular part hardens;
    heating first and second skin layers of a reinforced thermoplastic material to a softening temperature in the range of 120° C. to 200° C.; and
    cold-pressing, at a pressure in a range of 10 bars to 30 bars, in a single step of molding, a stack comprising the heated first and second skin layers and the cellular part between the first and second skin layers to form the thermoplastic composite article wherein the article has substantially corresponding configuration to the cellular part and has either a relatively non-uniform thickness or at least one portion of the article is curved.

2. The method as claimed in claim 1, wherein the inner surfaces of the first and second skin layers have a substantially final non-planar or curved configuration after the step of heating and before the step of cold-pressing.

3. The method as claimed in claim 1, wherein the skin layers are made of a woven fabric or mat of glass fibers and the thermoplastic material.

4. The method as claimed in claim 1, wherein at least one portion of the part is curved.

5. The method as claimed in claim 1, wherein the article is recyclable.

6. The method as claimed in claim 1, wherein the cellular part and the skin layers are constituted mainly of polyolefin or polypropylene.

7. The method as claimed in claim 1, wherein the first set of projections are interdigitated with respect to the second set of projections.

8. The method as claimed in claim 1, wherein the mold is filled using an injection molding machine and wherein the part is an injection molded part.

9. The method as claimed in claim 1, wherein the projections are tapered to facilitate removal of the part from the mold cavity.

10. The method as claimed in claim 1, wherein the cellular part is constituted mainly of polyolefin or polypropylene.

11. The method as claimed in claim 1, wherein outer surfaces of the cellular part have a substantially final non-planar or curved configuration after the step of removing.

12. The method as claimed in claim 1, wherein the cellular part has a thickness in a range of 5 mm to 30 mm and wherein the open cells have a diameter in a range of 2 mm to 10 mm.

13. The method as claimed in claim 1, wherein the cellular part has a honeycomb-like structure.

14. The method as claimed in claim 1, further comprising providing a flange which extends into the cavity to define a hinge between two portions of the cellular part.

15. The method as claimed in claim 14, wherein the flange extends into the cavity from the interior surface of the cavity.

16. The method as claimed in claim 1, wherein the projections have self-lubricating surface layers which define the open cells of the cellular part and which facilitate removal of the part from the mold cavity.

17. The method as claimed in claim 1, wherein the first and second skin layers have a substantially uniform thickness.

18. A system for making a thermoplastic composite article, the system comprising:
   a mold having a mold cavity with an interior surface to define the shape of a cellular part and at least one resin flow path extending from an outer surface of the mold to the mold cavity;
   first and second sets of projections, the first set of projections extending into the mold cavity from a first direction and the second set of projection extending into the mold cavity from the second direction opposite the first direction, the projections defining cells which open to opposing outer surfaces of the cellular part, wherein the projections have different lengths and wherein different portions of the cellular part have corresponding different thicknesses or at least one portion of the cellular part is curved;
   an injection molding machine for filing the mold cavity, with the projections extending into the mold cavity, with molten plastic resin from the at least one resin flow path;
   means for heating first and second skin layers of a reinforced thermoplastic material to a softening temperature in the range of 120° C. to 200° C.; and
   a cold-pressing mold for cold-pressing, at a pressure in a range of 10 bars to 30 bars, a stack of comprising the heated first and second skin layers and the cellular part between the first and second skin layers to form the thermoplastic composite article, wherein the article has substantially corresponding configuration to the cellular part and has either a relatively non-uniform thickness or at least one portion of the article is curved.

19. The system as claimed in claim 18, wherein the at least one portion of the part is curved.

20. The system as claimed in claim 18, wherein the article has a relatively non-uniform thickness.

21. The system as claimed in claim 18, wherein the first and second skin layers have a substantially uniform thickness.

* * * * *